United States Patent
Sipila

(10) Patent No.: US 8,571,160 B2
(45) Date of Patent: Oct. 29, 2013

(54) FREQUENCY ESTIMATION

(75) Inventor: Teemu Taneli Sipila, Oulunsalo (FI)

(73) Assignee: Nokia Corporation, Espoo (FI)

( * ) Notice: Subject to any disclaimer, the term of this patent is extended or adjusted under 35 U.S.C. 154(b) by 1145 days.

(21) Appl. No.: 12/222,107

(22) Filed: Aug. 1, 2008

(65) Prior Publication Data

US 2009/0232231 A1 Sep. 17, 2009

(30) Foreign Application Priority Data

Mar. 17, 2008 (EP) .................... 08004934

(51) Int. Cl.
*H04L 7/04* (2006.01)

(52) U.S. Cl.
USPC ........... 375/362; 375/326; 375/344; 375/260; 375/343; 375/371

(58) Field of Classification Search
USPC ......... 375/260, 226, 326, 327, 343, 344, 362, 375/371
See application file for complete search history.

(56) References Cited

U.S. PATENT DOCUMENTS

2008/0151980 A1\* 6/2008 Lindoff et al. ................. 375/226
2009/0003423 A1\* 1/2009 Oh et al. ....................... 375/226

\* cited by examiner

*Primary Examiner* — Phuong Phu
(74) *Attorney, Agent, or Firm* — Squire Sanders (US) LLP

(57) ABSTRACT

For estimating a difference between a frequency of a base station and a locally generated frequency of a mobile equipment in a mobile communications network, wherein at least a signal in a plurality of signals transmitted from the base station and received by the mobile equipment comprises a plurality of symbols each of which includes a cyclic prefix, a correlation between a symbol and its cyclic prefix is used for estimating the frequency difference.

38 Claims, 7 Drawing Sheets

FREQUENCY ESTIMATION

FIELD OF THE INVENTION

The present invention relates to a method and an apparatus for estimating a difference between a frequency of a base station and a locally generated frequency of a mobile equipment in a mobile communications network as well as a computer program adapted to carry out such a method.

BACKGROUND OF THE INVENTION

A mobile handset has to keep the frequency of its local oscillator close to the frequency of the signal it receives from the base station. This is required in particular in orthogonal frequency division multiplexing (OFDM) systems like WiMAX (worldwide interoperability for microwave access), 3.9G or digital video broadcast (DVB) systems etc.

OFDM systems promise high data rates with low complexity due to the simplicity of the fast Fourier transformation (FFT) and one-tap propagation channel. However, this can be assured only if the receiver is in a synchronization mode. A drawback of OFDM systems is that they are very vulnerable to frequency errors. That is why many kinds of accessories are needed around the FFT to keep it accurately in the synchronization mode. If not designed carefully, the synchronization algorithms can significantly increase the complexity of the receiver.

The difference between the base station transmitter frequency and the locally generated frequency at the handset is called the carrier frequency offset (CFO). WiMAX has its roots in the fixed networks. The deployment of WiMAX in mobile cellular environment will cause the handsets to experience lots of interference from neighbouring cells. Many prior art CFO estimation methods may suffer from interferences coming from other base stations or cells.

The mobile WiMAX system is such a new system that there are no conventional methods easily available. There is at least one method available which is similar to those used in WLANs. However, such a method suffers from other-cell interferences.

SUMMARY OF THE INVENTION

It is an object of the present invention to reduce the disadvantageous effect of other-cell interferences.

In order to achieve the above and further objections, according to a first aspect of the present invention, there is provided a method for estimating a difference between a frequency of a base station and a locally generated frequency of a mobile equipment in a mobile communications network, wherein at least a signal in a plurality of signals received from the base station comprises a plurality of symbols each of which includes a cyclic prefix, and wherein a correlation between a symbol and its cyclic prefix is used for estimating the frequency difference.

In accordance with a second aspect of the present invention, there is provided an apparatus for estimating a difference between a frequency of a base station and a locally generated frequency of a mobile equipment in a mobile communications network wherein at least a signal in a plurality of signals received from the base station comprises a plurality of symbols each of which includes a cyclic prefix, comprising correlation determining means for determining a correlation between a symbol and its cyclic prefix and means for estimating the frequency difference on the basis of the result of the correlation.

In accordance with a third aspect of the present invention, there is provided a receiver of a mobile equipment in a mobile communications network for receiving a plurality of signals from a base station, wherein at least a signal comprises a plurality of symbols each of which includes a cyclic prefix, comprising a correlator configured to generate a correlation between a symbol and its cyclic prefix, and an estimator configured to estimate a difference between the frequency of the base station and a locally generated frequency of the mobile equipment on the basis of the result of the correlation.

In accordance with a fourth aspect of the present invention, there is provided a computer program adapted to carry out the method according to the first aspect.

According to the present invention, a signal comprises a plurality of symbols, and each symbol includes a cyclic prefix. Usually, a cyclic prefix is defined as being a repeat of the end of the symbol at its beginning.

The present invention is advantageous in that the effect of other-cell interferences is reduced. Namely, it has been found that the other cells cause a bias to the estimate which bias is dependent on the preamble the other cell is using and the preamble the actual cell is using. According to the present invention, such a bias is reduced by using a correlation between a symbol and its cyclic prefix. A further advantage achieved by the invention is that the range of the estimate is extended. So, the invention provides a robust measure for frequency difference estimation under other-cell interferences.

The invention does not impose additional requirements so as to be implemented in a communication system. Application specific integrated circuits (ASICs), digital signal processors (DSPs) and application specific integrated processors (ASIPs) can be used as it is normally done. The overall complexity of the invention is small, since the processing is done once per short frame, e.g. per 5ms frame.

The invention is suitable to be provided for any kind of OFDM systems like WiMAX systems and 3.9G systems which provide high data rates for internal applications.

Further advantageous embodiments and modifications are defined in the dependent claims.

Preferably, the method is used in an orthogonal frequency division multiplexing (OFDM) system, wherein the difference between the frequency of the base station and the locally generated frequency of the mobile equipment is a carrier frequency offset (CFO).

The correlation between a symbol and its cyclic prefix may be carried out at the time of occurrence of the cyclic prefix.

In a further embodiment, the signal defines a frame and one of its symbols is provided as a preamble occurring at the beginning of the frame and including a cyclic prefix, wherein a correlation between a preamble and its cyclic prefix is used for estimating the frequency difference. So, in this embodiment the signal is defined as a frame including a plurality of symbols, wherein one of the symbols is provided as the preamble which occurs at the beginning of the frame. The preamble includes a cyclic prefix like the other symbols usually do also.

In still a further exemplary embodiment, a late frequency difference estimate is generated by using the equation $$y_L = y_L[\hat{n}] = y[\hat{n}] = \sum_{\eta=0}^{N_{FFT}-1} p^*[\eta] r[\hat{n} - \eta],$$

where $$\underline{p}^*[\eta]$$

is the complex conjugate of a preamble in reversed order and r[n̂−η] is the received signal, and n̂ is the correct timing instant where the cyclic prefix occurs.

The cyclic prefix may be created as a replica of last samples of an actual symbol. According to an advantageous modification of this embodiment an early frequency difference estimate is generated by using the equation $$y_E = y_E[\hat{n}] = \sum_{\eta=0}^{N_{FFT}-1} \underline{p}_E^*[\eta] r[\hat{n} - N_g - \eta]$$

where $$\underline{p}_E^*[\eta]$$

is the complex conjugate of a preamble in reversed order, $N_g$ is the number of the last samples of the actual symbol, r[n̂−$N_g$−η] is the received signal and n̂ is the correct timing instant where the cyclic prefix occurs.

BRIEF DESCRIPTION OF THE DRAWINGS

The invention will now be described based on embodiments with reference to the accompanying drawings in which.

DESCRIPTION OF THE EXEMPLARY EMBODIMENT

Figure 1:
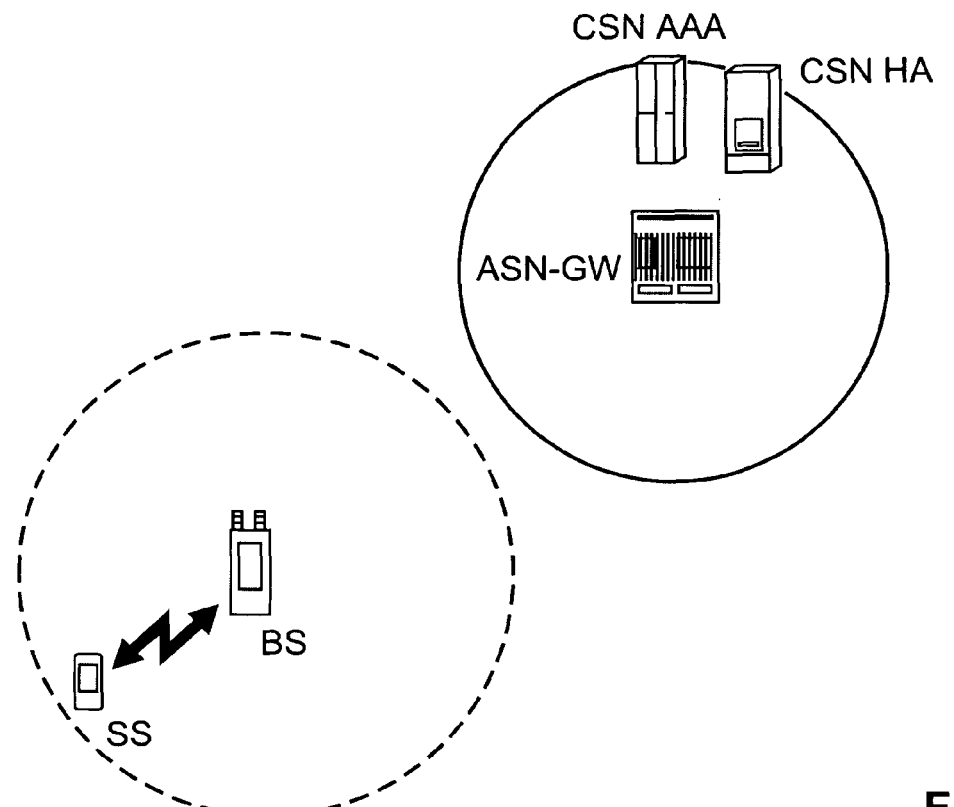
FIG. 1 is schematic view of a WiMAX system.

FIG. 1 schematically shows a telecommunication network system having a WiMAX network architecture. Shown as an example is a base station BS defining a cell. Within this cell shown is a mobile equipment which operates as a mobile subscriber station SS. There is a radio link between the base station BS and the mobile subscriber station SS. As shown in FIG. 1, the WiMAX network architecture further comprises an access service network gateway ASN-GW providing access to an access service network. A connectivity service network home agent CSN HA and a CSN AAA (connectivity service network authentication /authorization/accounting) are connected to the access service network gateway ASN-GW. Although not shown in FIG. 1, it should be added here that the base station BS includes a data processor, a memory which stores a program and a suitable radio frequency transceiver for bidirectional wireless communication with the mobile subscriber station SS, and that the mobile subscribers station SS includes a data processor, a memory which stores a program and a suitable radio frequency transceiver, too.

Figure 2:
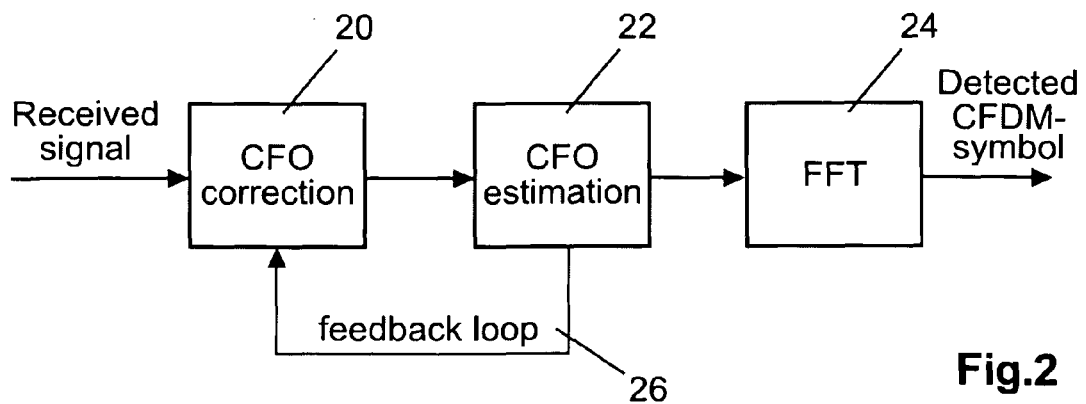
FIG. 2 shows a schematical block diagram of a relevant portion of a receiver in a mobile equipment to be used in a mobile WiMAX system according to a exemplary embodiment.

FIG. 2 shows a schematical block diagram of a relevant part of a receiver in a mobile equipment to be used in a mobile WiMAX system according to a exemplary embodiment. As shown in FIG. 2, a signal is received by a CFO corrector 20 which corrects the CFO and outputs the corrected CFO to a CFO estimator 22. The CFO (carrier frequency offset) estimator 22 uses the corrected CFO for estimating the CFO and outputs the value of the corrected CFO to a fast Fourier transformer 24. The fast Fourier transformer 24 generates an OFDM symbol on the basis of the estimated CFO. As further shown in FIG. 2, a feedback loop 26 is provided from the CFO estimator 22 back to the CFO corrector 20 so as to have a control of the CFO correction carried out in the CFO corrector 20.

Almost all CFO estimators are based on the idea that there is a waveform (e.g. a training symbol) that repeats regularly, the phase of that waveform is measured at each occurrence, the CFO is relative to the phasor rotation between two consecutive occurrences, and the maximum CFO that can be estimated is ½D where D is the time difference between the two occurrences. The same idea holds for time-domain and frequency-domain estimators.

The mobile WiMAX system is such a new system that there are no conventional methods easily available. But one evident method is described next. This method is similar to those used in WLANs (wireless local area networks) for example.

In mathematical terms, first a channel autocorrelation estimate at lag D is determined. The channel autocorrelation estimate is a complex number β·$e^{-j\theta}$ whose amplitude is β and phase is θ. The phase θ is obtained from the channel autocorrelation estimate as follows:

θ=arc tan(β·$e^{-j\theta}$).

From this phase estimate θ, the frequency offset estimate $f_\Delta$ (in Hz) is obtained as follows:

$$f_\Delta = -\frac{1}{2\pi D}\theta.$$

This described procedure is common among different CFO estimators. The differences are in the way the channel autocorrelation estimate β·$e^{-j\theta}$ is obtained. The repeated waveform is needed in an estimation of β·$e^{-j\theta}$.

Figure 3:
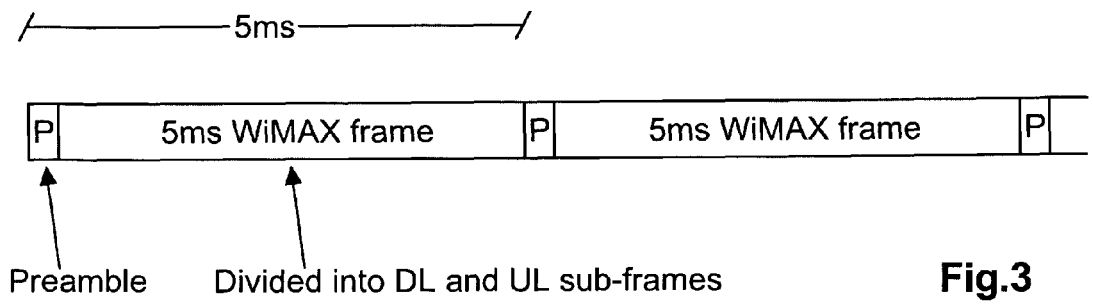
FIG. 3 schematically shows an arrangement of WiMAX frames in a row.

FIG. 3 schematically shows an arrangement of WiMAX frames in a row. In the exemplary embodiment, 5 ms frames are used. Each frame consists of a plurality of OFDM symbols. Each OFDM symbol includes a cyclic prefix which is a repeat of the end of the symbol and at its beginning One of the OFDM symbols in a frame is called preamble which occurs in the beginning of the frame as shown in FIG. 3 where the preamble is characterized by "P". The preamble includes a cyclic prefix just like the other OFDM symbols also do. However, the preamble differs from the other OFDM symbols in that it does not contain any payload data but a signal used for synchronization (in time and frequency) as well as for power estimation purposes. In accordance with the present example, the distance between the two preambles is 5 ms, i.e. D=5 ms. This would mean that the maximum CFO which can be unambiguously estimated is ±100 Hz:

$$|f_\Delta| \leq \frac{1}{2 \cdot 0.005} = 100 \text{ Hz}$$

The approach of estimating the frequency offset from two consecutive preambles yields a too small range. The residual frequency error that is allowed in WiMAX is 156 Hz to 219 Hz depending on the bandwidth used by the WiMAX operator.

Because the next preamble is too far away, the CFO estimation must be done inside the preamble. The time-domain representation of the preamble has cyclic properties. The preamble symbol can be approximately written in time-domain as $$p \approx [a \quad b \quad a \quad b \quad a \quad b] = [a \quad \underline{a}^* \quad a \quad \underline{a}^* \quad a \quad \underline{a}^*]$$

where a is a row-vector and $$\underline{a}^*$$

is the complex conjugate of vector a in reversed order. When studied more carefully, it is found that p for a fast Fourier transformation FFT with $N_{FFT}=512$ can be approximated by a concatenation of three almost identical and periodic row-vectors $$p \approx [p_0 \, p_1 \, p_2]$$

with $$p_0 = [p[0], p[1], \ldots, p[170]]$$

$$p_1 = [p[171], p[172], \ldots, p[340]]$$

$$p_2 = [p[341], p[342], \ldots, p[511]]$$

Therefore, the lengths of vectors $p_0$, $p_1$, and $p_2$ are 171, 170, and 171, respectively. For a fast Fourier transformation with $N_{FFT}=1024$, the vector-lengths are 341, 342, 341, respectively.

The correlation result between a received signal r[n] and the known preamble at time index n is $$y[n] = \sum_{\eta=0}^{N_{FFT}-1} \underline{p}^*[\eta] r[n-\eta],$$

where $$\underline{p}^*[\eta]$$

is the complex conjugate of the preamble in reversed order.

The correlation result above can be written in vector notation as follows:

$$Y[n] = P^H r[n]$$

which can be written in three parts:

$$y[n] = y_0[n] + y_1[n] + y_2[n]$$
$$= p_0^H r_0[n] + p_1^H r_1[n] + p_2^H r_2[n].$$

Let $\hat{n}$ be the correct timing instant, when considering $y_0[\hat{n}]$, $y_1[\hat{n}]$, and $y_2[\hat{n}]$ more carefully, for simplicity it is assumed that there is only one multipath (characterized by a channel coefficient h) and noise is ignored, so as to obtain the following equations:

$$y_0 = y_0[\hat{n}]$$
$$= p_0^H r_0[\hat{n}]$$
$$= \sum_{\eta=0}^{170} p_0^*[\eta] \left( h p_0[\eta] \cdot e^{(-j2\pi f_\Delta)(\hat{n}+\eta)T_s} \right)$$
$$= \sum_{\eta=0}^{170} h \cdot |p_0[\eta]|^2 \cdot e^{(-j2\pi f_\Delta)(\hat{n}+\eta)T_s}$$
$$\approx h \cdot c \cdot e^{(-j2\pi f_\Delta)(\hat{n}+85)T_s}$$

$$y_1 = y_1[\hat{n}]$$
$$= p_1^H r_1[\hat{n}]$$
$$= \sum_{\eta=0}^{169} p_1^*[\eta] \left( h p_1[\eta] \cdot e^{(-j2\pi f_\Delta)(\hat{n}+\eta+171)T_s} \right)$$
$$= \sum_{\eta=0}^{169} h \cdot |p_1[\eta]|^2 \cdot e^{(-j2\pi f_\Delta)(\hat{n}+\eta+171)T_s}$$
$$\approx h \cdot c \cdot e^{(-j2\pi f_\Delta)(\hat{n}+255.5)T_s}$$

$$y_2 = y_2[\hat{n}]$$
$$= p_2^H r_2[\hat{n}]$$
$$= \sum_{\eta=0}^{170} p_2^*[\eta] \left( h p_2[\eta] \cdot e^{(-j2\pi f_\Delta)(\hat{n}+\eta+341)T_s} \right)$$
$$= \sum_{\eta=0}^{170} h \cdot |p_2[\eta]|^2 \cdot e^{(-j2\pi f_\Delta)(\hat{n}+\eta+341)T_s}$$
$$\approx h \cdot c \cdot e^{(-j2\pi f_\Delta)(\hat{n}+426)T_s}$$

Figure 4:
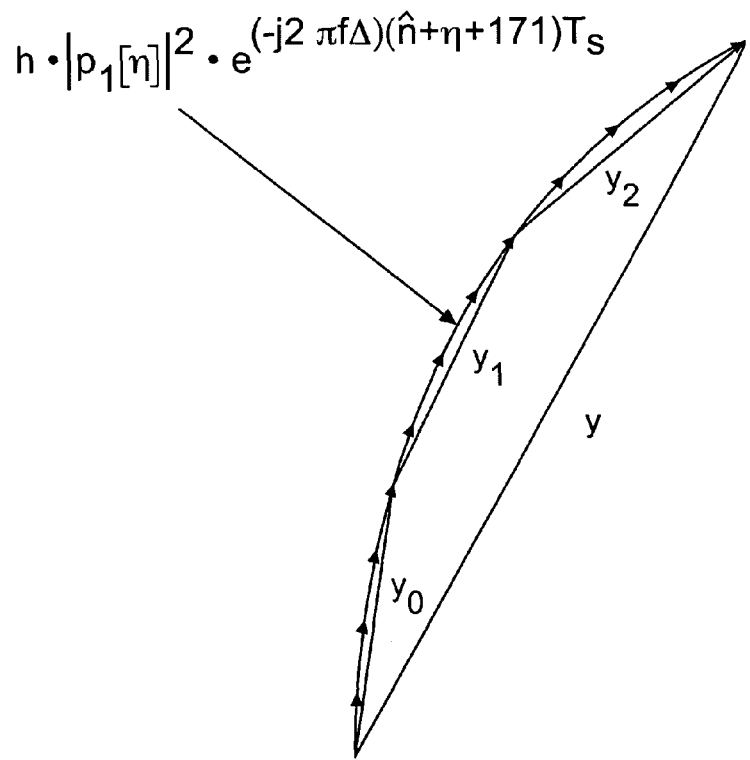
FIG. 4 is a geometrical diagram in the complex plane showing the correlation between a preamble and a received signal.

The scenario according to the aforementioned equations is illustrated geometrically in a complex plane in FIG. 4. The correlations between the preamble and the received signal is the complex number y that is the sum of $y_o$, $y_1$ and $y_2$, which in term are sums of sample-wise numbers shown in the above equations. However, there are actually much more of these small arrows (e.g. 512 or 1024), but for sake of simplicity only some arrows are shown in FIG. 4.

Taking the (auto)correlation between the three cycles of the preamble results in the following equations:

$$y_0^* y_1 = h^* h \cdot c^* c' \cdot (e^{(-j2\pi f_\Delta T_s)170.5})$$
$$= \beta_0 \cdot e^{(-j2\pi f_\Delta T_s)170.5}$$
$$= \beta_0 \cdot e^{-j\theta}$$

$$y_1^* y_2 = h^* h \cdot c'^* c \cdot (e^{(-j2\pi f_\Delta T_s)170.5})$$
$$= \beta_1 \cdot e^{(-j2\pi f_\Delta T_s)170.5}$$
$$= \beta_1 \cdot e^{-j\theta}$$

The CFO estimator estimates the channel autocorrelation at lag D, where D is now 170.5 samples. The two estimates $y_0^* y_1$ and $y_1^* y_2$ are averaged to get the final estimate for the channel autocorrelation at lag D so as to obtain $$\beta \cdot e^{-j\theta} = (y_0^* y_1 + y_1^* y_2)/2$$

Figure 5:
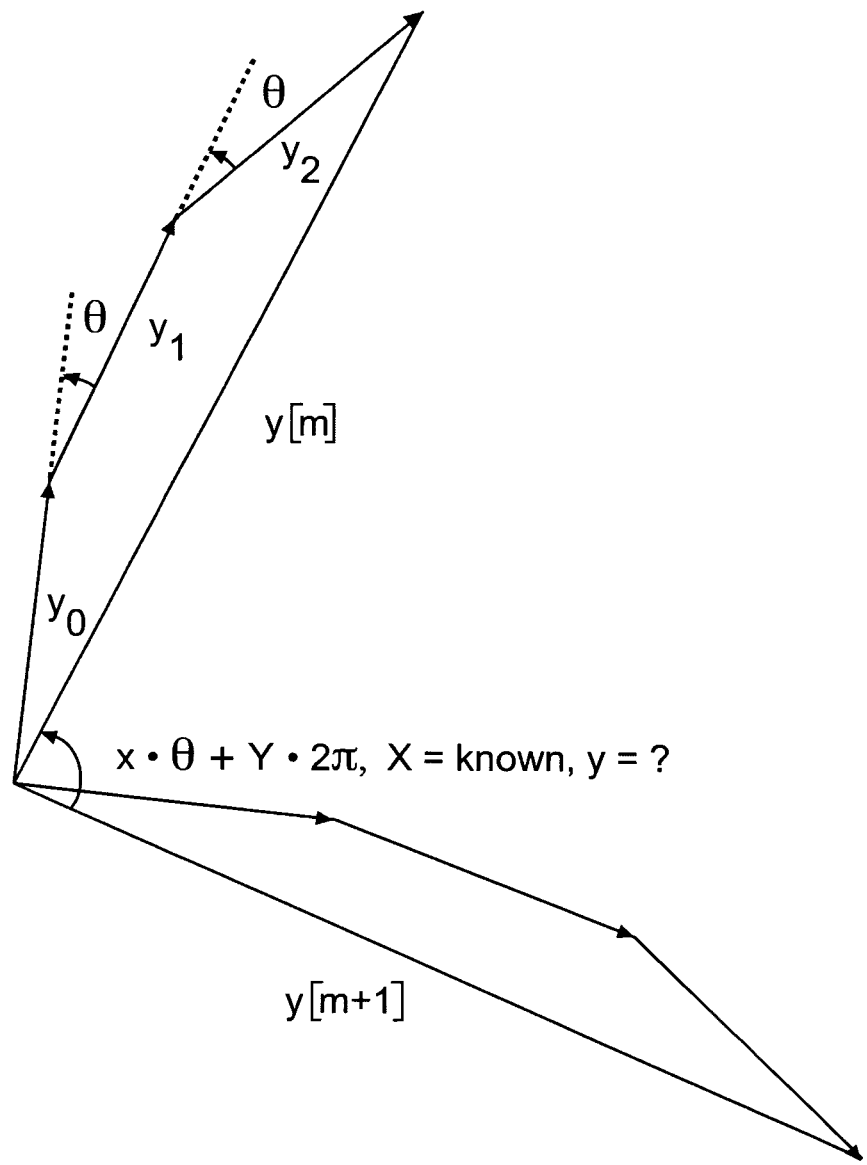
FIG. 5 is a geometrical diagram showing correlation results as vectors and the phase therebetween as angle.

The phase of the channel autocorrelation θ which is proportional to the CFO is illustrated geometrically in FIG. 5. The angle between $y_0$ and $y_1$, and between $y_1$ and $y_2$ in FIG. 5 is proportional to the CFO. For a better illustration, the next frame m+1 is also shown in FIG. 5. The angle between y[m] and y[m+1] is also proportional to the CFO. Here, the problem is that it cannot be found out how many full revolutions has happened between y[m] and y[m+1]. One full revolution corresponds to 200 Hz as shown above.

The autocorrelation value $\beta \sim e^{-j\theta}$ is a complex number that is produced once per frame. This channel autocorrelation value is then converted into Hertz as described above.

This method similar to those in WLANs suffers from other-cell interferences. The other cells cause a bias to the estimate. The bias is dependent on the preamble that the other cell is using and the preamble that the actual cell is using. Some examples with different preamble-pairs are shown in the following table:

| (Segment, Preamble Index, IDcell) First own cell, then interfering cell | True CFO | Estimated CFO |
|---|---|---|
| (0, 0, 0) (1, 100, 4) | 50 Hz | 96 Hz |
| (0, 0, 0) (0, 19, 19) | 50 Hz | 47 Hz |
| (2, 73, 9) (0, 0, 0) | 50 Hz | −151 Hz |
| (2, 73, 9) (1, 100, 4) | 50 Hz | −403 Hz |
| (2, 73, 9) (0, 19, 19) | 50 Hz | 319 Hz |

For simplicity, the noise is ignored, and only one channel tap is considered. The output of a matched filter at the correct sampling instant ñ is:

$$y[\hat{n}] = p^H r^o[\hat{n}] + p^H r^i[\hat{n}] \text{ or } y = p^H r^o + p^H r^i$$

where $r^o$ and $r^i$ are the contribution of the actual and interfering cells to the received signal. The ⅓rd-portions of the correlations produced by the above method will look as follows:

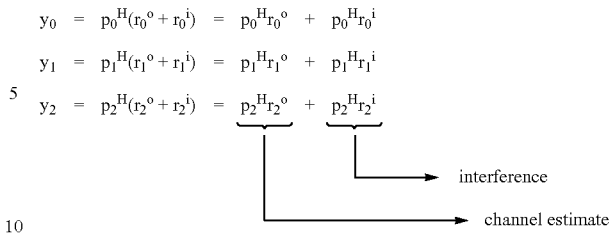

Figure 6:
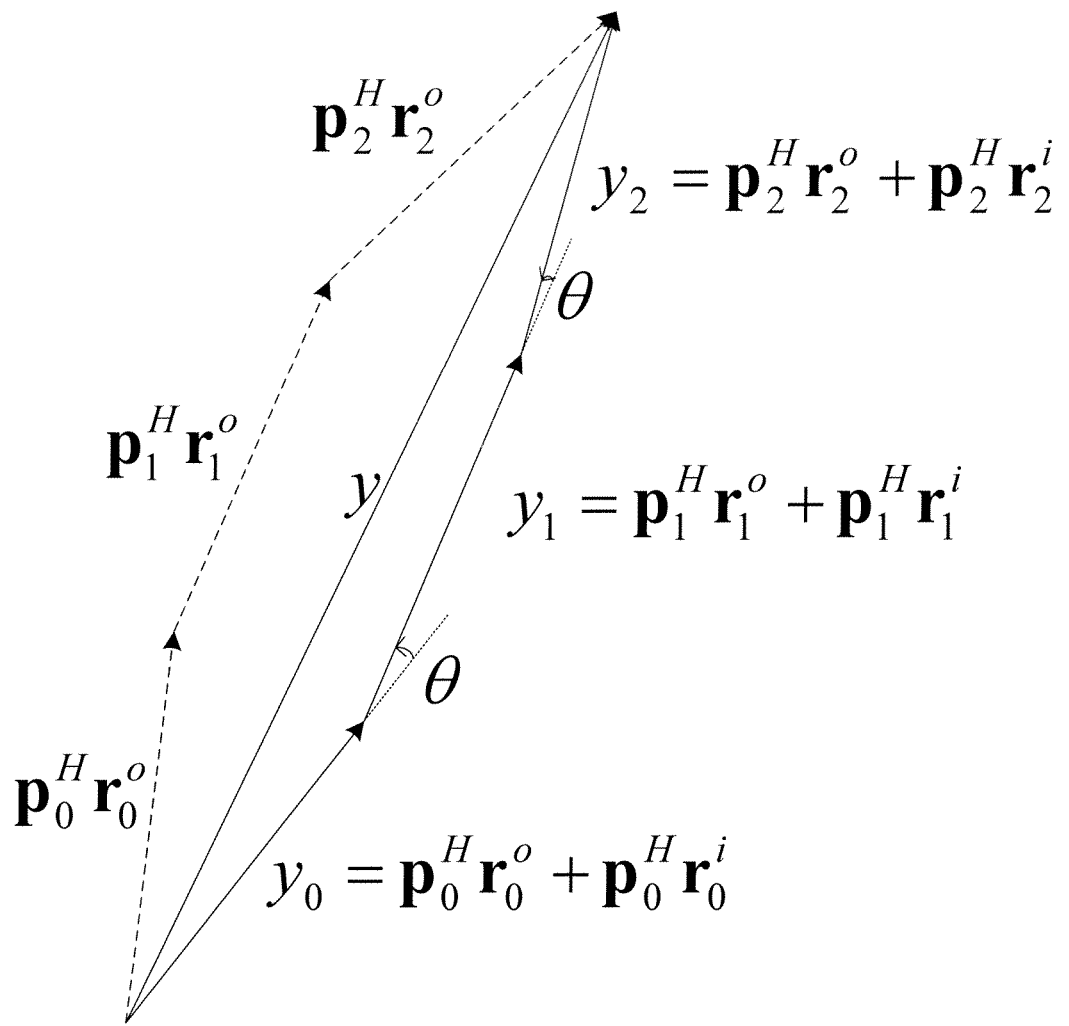
FIG. 6 is a geometrical diagram showing a scenario wherein other-cell interferences cause the channel estimates $y_0$, $y_1$, and $y_2$ being complex numbers to take different routes to form another channel estimate also being a complex number compared to the route shown as dashed line without other-cell interferences.

The scenario according to the above equation is illustrated geometrically in FIG. 6 which shows that the other-cell interferences cause the complex numbers $y_0$, $y_1$, and $y_2$ representing channel estimates to take different routes to form the complex number y representing another channel estimate, compared to the route when no other-cell interference (from another segment) is present. The dashed route is the route that "should be taken". Of course, such a route is not available because the interferer-cell contributions to $y_0$, $y_1$, and $y_2$ cannot be taken out. It is evident that in the case of FIG. 6 the angles θ are distorted.

Figure 7:
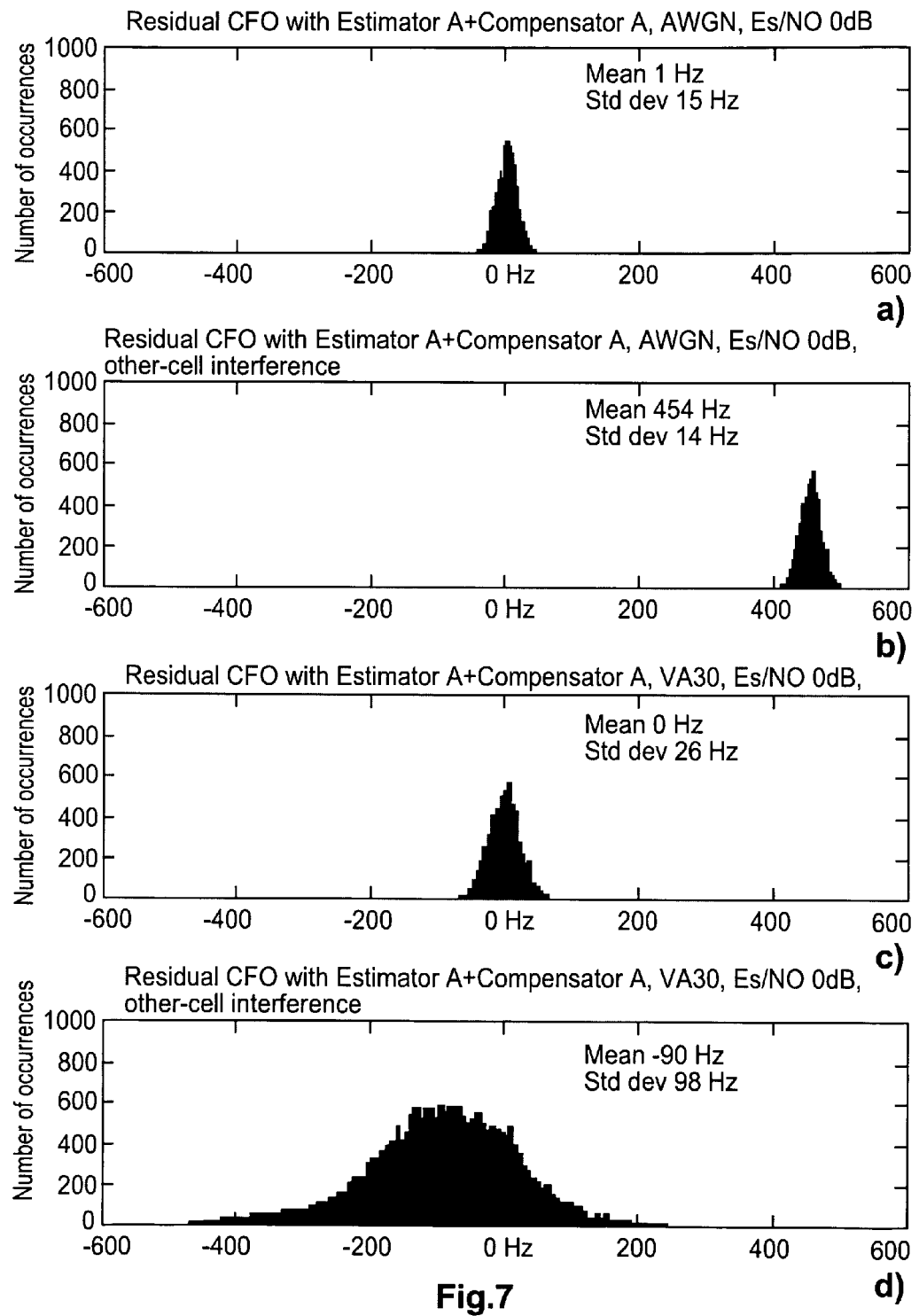
FIG. 7 shows results of an example simulation for a conventional method.

FIG. 7 shows residual CFO histograms for the above described conventional method based on an example simulation, wherein FIG. 7a shows a situation for an additive white Gaussian noise channel without other-cell interferences and FIG. 7b for the same channel with the occurrence of other-cell interference and FIG. 7c shows a situation for a vehicular channel at a speed of 30 km/h without other-cell interferences and FIG. 7d for the same channel with the occurrence of other-cell interference. From FIG. 7 it is clearly seen that other-cell interferences cause distortion to the CFO estimate.

Figure 8:
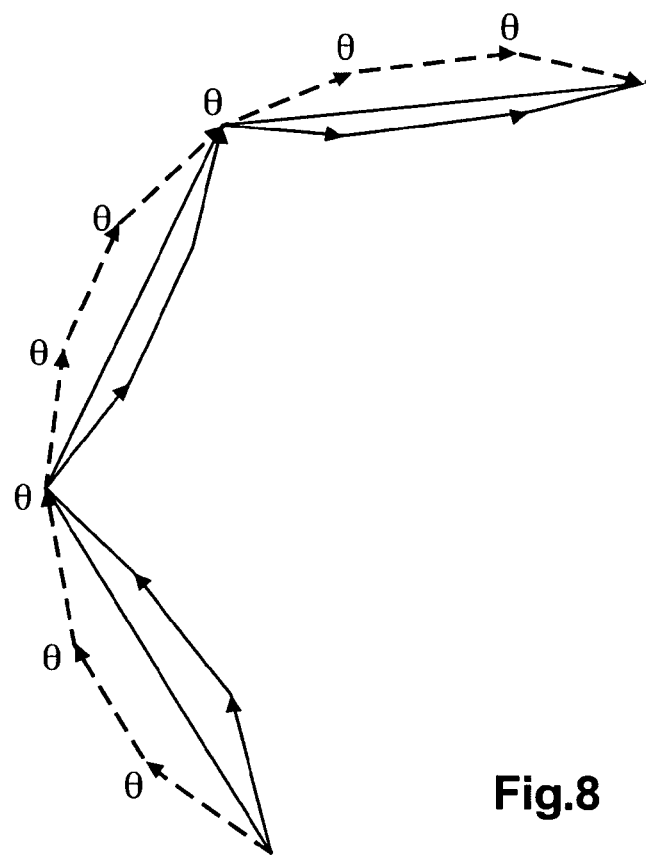
FIG. 8 is a geometrical diagram showing a scenario wherein the preceding and following OFDM symbols are also preambles.

Now, under the assumption that the proceeding and the following OFDM symbols are also preambles, the case looks like as shown in FIG. 8, wherein the CFO causes the channel estimates to rotate smoothly in one direction which is illustrated by the angles θ. At symbol boundary, the angle θ should be the same as inside the symbol. It is seen that there is only one route (the dashed line) possible to fulfill this condition. The alternative routes (one shown) distorted by interference will have a different angle at the symbol boundary compared to the angles inside the symbol.

Figure 9:
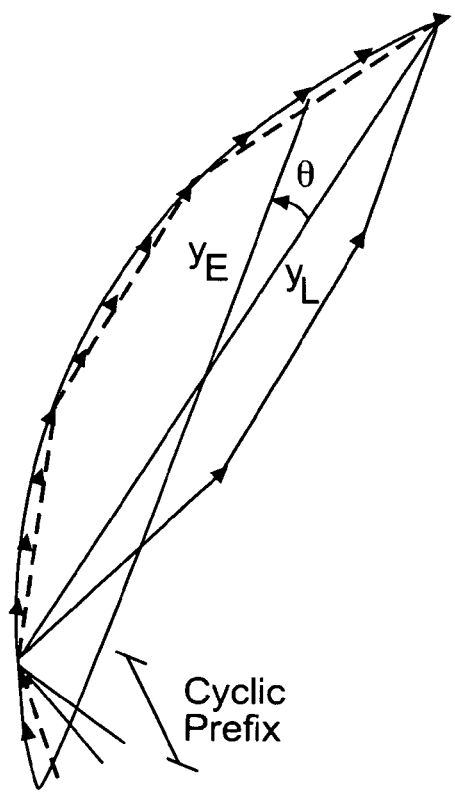
FIG. 9 is a portion of FIG. 5 and additional shows a cyclic prefix schematically as well as an early channel estimate and a late channel estimate.

Of course, there are not so many preambles following each other as shown in FIG. 8. But indeed, there is a portion of the preceding 'preamble', which portion is a cyclic prefix. Usually, the cyclic prefix is situated at the beginning of the preamble of a symbol, and generates a "pseudo-periodicy" which enables an easier frequency domain equalization of the received signal. This is because the transmission channel can be regarded as a linear transfer function. The geometric representation of the cyclic prefix plus the actual preamble symbol is shown in FIG. 9 as an example. Many ways of eliminating the other-cell interference come evident from the picture. An embodiment of a simple and straightforward method is illustrated in FIG. 9.

In this embodiment, by using an extra time provided by the cyclic prefix, two full-symbol length channel estimates $y_E$ ("E" for early) and $y_L$ ("L" for late) can be produced. Because they are full-symbol long, the other cells' preambles (from other segments) are orthogonal and thus do not interfere them. The angle between these two channel estimates is the estimate for the angle of the channel autocorrelation at lag $T_g$ which is the time duration of the cyclic prefix.

For generating a late channel estimate, the CFO estimator needs the correlation between the received signal and the preamble at the correct timing instant $\hat{n}$ in order to obtain the late channel estimate in accordance with the following equation:

$$y_L = y_L[\hat{n}] = y[\hat{n}] = \sum_{\eta=0}^{N_{FFT}-1} p^*[\eta] r[\hat{n} - \eta],$$

For generating an early channel estimate, the cyclic prefix (CP) is provided as a replica of the last $N_g$ samples of the symbol, wherein $N_g$ is 64 for a fast Fourier transformation with $N_{FFT}=512$ and 128 for a fast Fourier transformation with $N_{FFT}=1024$. The following notation is used for a vector starting with the cyclic prefix of the preamble and then continuing with the first ($N_{FFT}-N_g$) samples of the actual preamble symbol:

$$p_E = [p_E[0] \ldots p_E[n] \ldots p_E[N_{FFT}-1]]^T$$
$$= [p[N_{FFT}-N_g] \ldots p[N_{FFT}-1]p_E[0] \ldots p[N_{FFT}-N_g-1]]^T$$

Using $p_E$, the early estimate can be written as:

$$y_E = y_E[\hat{n}] = \sum_{\eta=0}^{N_{FFT}-1} p_E^*[\eta] r[\hat{n} - N_g - \eta]$$

For simplicity, under the assumption that there is only one multipath (channel coefficient h) and noise is ignored, the following equations are obtained for $y_E$ and $y_L$:

$$y_E = y_E[\hat{n}]$$
$$= p_E^H r[\hat{n} - N_g]$$
$$= \sum_{\eta=0}^{N_{FFT}-1} p_E^*[\eta] \left( h p_E[\eta] \cdot e^{(-j2\pi f_\Delta)(\hat{n}+\eta-N_g)T_s} \right)$$
$$= \sum_{\eta=0}^{N_{FFT}-1} h \cdot |p_E[\eta]|^2 \cdot e^{(-j2\pi f_\Delta)(\hat{n}+\eta-N_g)T_s}$$
$$\approx h \cdot c \cdot e^{(-j2\pi f_\Delta)(\hat{n}-N_g+N_{FFT}/2)T_s}$$

$$y_L = y_L[\hat{n}]$$
$$= p^H r[\hat{n}]$$
$$= \sum_{\eta=0}^{N_{FFT}-1} p^*[\eta] \left( h p[\eta] \cdot e^{(-j2\pi f_\Delta)(\hat{n}+\eta)T_s} \right)$$
$$= \sum_{\eta=0}^{N_{FFT}-1} h \cdot |p[\eta]|^2 \cdot e^{(-j2\pi f_\Delta)(\hat{n}+\eta)T_s}$$
$$\approx h \cdot c' \cdot e^{(-j2\pi f_\Delta)(\hat{n}+N_{FFT}/2)T_s}$$

By taking the (auto)correlation between the two channel estimates, the result is $$y_E^* y_L = h^* h \cdot c^* c' \cdot \left(e^{(-j2\pi f_\Delta)(\hat{n}-N_g+N_{FFT}/2)T_s}\right)^* \left(e^{(-j2\pi f_\Delta)(\hat{n}+N_{FFT}/2)T_s}\right)$$
$$= h^* h \cdot c^* c' \cdot (e^{(-j2\pi f_\Delta T_s)N_g})$$
$$= \beta \cdot e^{-j\theta}$$

The CFO estimator estimates the channel autocorrelation at lag D, where D is e.g. now ⅛th of the symbol time or $N_g$ samples. The range of this estimator is e.g. 31 kHz to 43 kHz depending on the bandwidth used by the WiMAX operator. The autocorrelation value $\beta \cdot e^{-j\theta}$ is a complex number produced once per frame. This channel autocorrelation value is then converted into Hertz as already described above.

Figure 10:
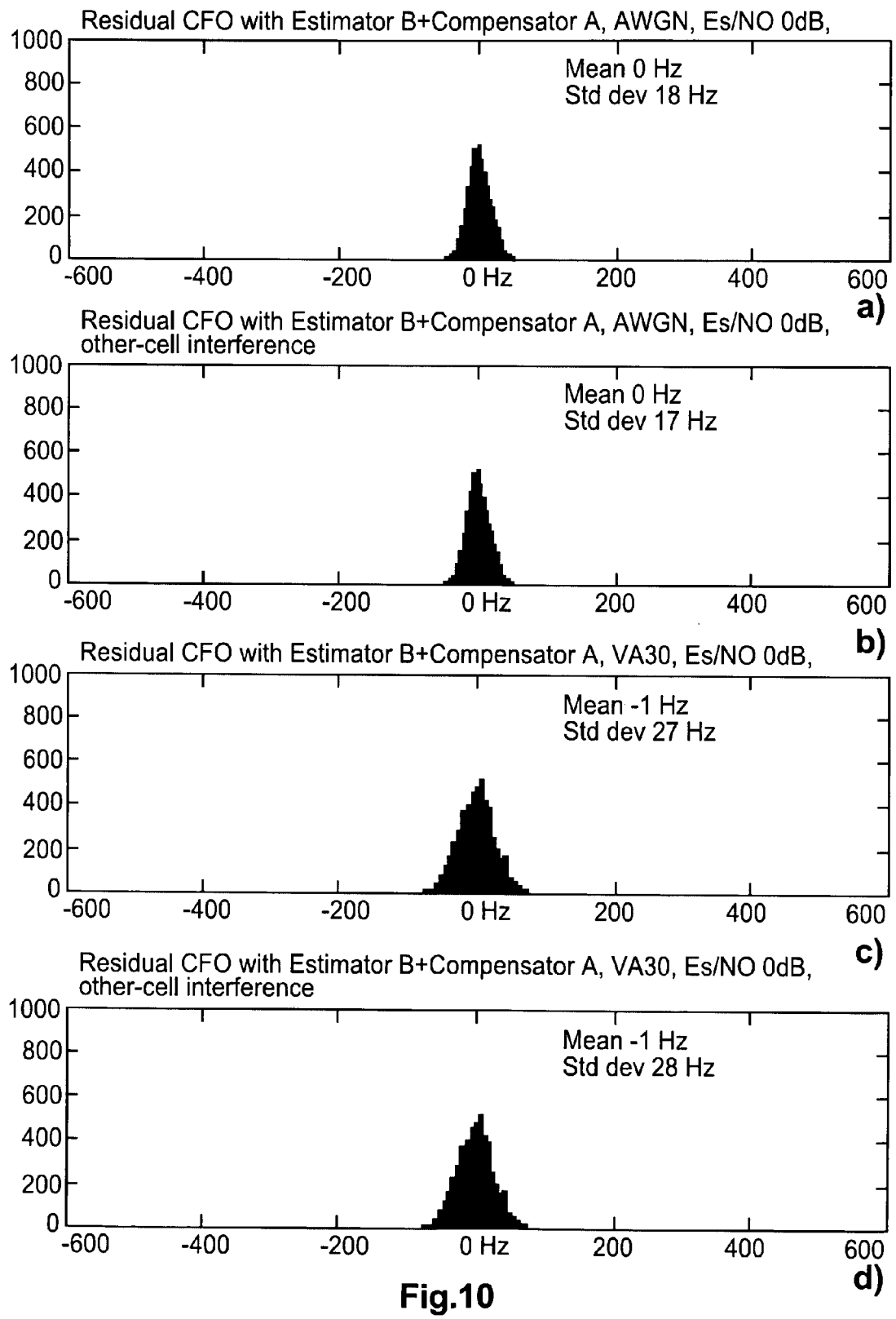
FIG. 10 shows results of an example simulation for a method according to a exemplary embodiment of the present invention.

FIG. 10 shows residual CFO histograms for the method as described above with reference to the FIGS. 8 and 9, wherein FIG. 10a shows a situation for an additive white Gaussian noise channel without other-cell interferences and FIG. 10b for the same channel with the occurrence of other-cell interference and FIG. 10c shows a situation for a vehicular channel at a speed of 30 km/h without other-cell interferences and FIG. 10d for the same channel with the occurrence of other-cell interference. When comparing FIG. 10 with FIG. 7 it becomes clear that, as shown in FIG. 10, other-cell interferences cause no distortion to the CFOs estimate when applying the method as described above with reference to the FIGS. 8 and 9.

The above described method may be implemented by computer software or by computer hardware or by a combination of computer software and hardware, preferably in the memory and processor of the mobile subscriber station.

Finally, it should be noted that the above described embodiment is of an example for implementing the present invention, but the scope of the present invention should not necessarily be limited by the above description. The scope of the present invention is defined by the following claims.

The invention claimed is:

1. A method, comprising:
   determining a correlation between a symbol received from a transmitter and a cyclic prefix of the symbol and outputting a result indicative thereof, wherein the correlation is determined based at least in part on the correlation between a late frequency difference estimate and an early frequency difference estimate; and
   estimating a frequency difference between a frequency of the transmitter and a locally generated frequency of a receiver according to the result of the correlation between the late frequency difference estimate and the early frequency difference estimate.

2. The method according to claim 1, which method is used in an orthogonal frequency division multiplexing (OFDM) system, wherein the difference between the frequency of the transmitter and the locally generated frequency of the receiver is a carrier frequency offset (CFO).

3. The method according to claim 1, wherein a correlation between a symbol and the cyclic prefix is carried out at the time of occurrence of the cyclic prefix.

4. The method according to claim 1, wherein a signal defines a frame and one of its symbols is provided as a preamble occurring at the beginning of the frame and including a cyclic prefix, and wherein a correlation between a preamble and the cyclic prefix is used for estimating the frequency difference.

5. The method according to claim 1, wherein the late frequency difference estimate is generated by using the equation $$y_L = y_L[\hat{n}] = y[\hat{n}] = \sum_{\eta=0}^{N_{FFT}-1} p^*[\eta] r[\hat{n} - \eta],$$

where $$\underline{p}^*[\eta]$$

is a complex conjugate of a preamble in reversed order and r[n̂–η] is a received signal, and n̂ is a correct timing instant where the cyclic prefix occurs.

6. The method according to claim 1, wherein the cyclic prefix is provided as a replica of last samples of an actual symbol.

7. The method according to claim 6, wherein the early frequency difference estimate is generated by using the equation:

$$y_E = y_E[\hat{n}] = \sum_{\eta=0}^{N_{FFT}-1} \underline{p}_E^*[\eta] r[\hat{n} - N_g - \eta]$$

where $$\underline{p}_E^*[\eta]$$

is a complex conjugate of a preamble in reversed order, $N_g$ is a number of the last samples of the actual symbol, r[n̂–$N_g$–η] is a received signal and n̂ is a correct timing instant where the cyclic prefix occurs.

8. The method according to claim 1, wherein said receiver is included in a mobile equipment and/or said transmitter is included in a base station.

9. An apparatus, comprising:
correlation determining means for determining a correlation between a symbol received from a transmitter and a cyclic prefix of the symbol and for outputting a result indicative thereof, wherein the correlation is determined based at least in part on the correlation between a late frequency difference estimate and an early frequency difference estimate; and
estimating means for estimating a frequency difference between a frequency of the transmitter and a locally generated frequency of a receiver according to the result of the correlation between the late frequency difference estimate and the early frequency difference estimate.

10. The apparatus according to claim 9, wherein the correlation determining means determines a correlation between a symbol and the cyclic prefix at the time of occurrence of the cyclic prefix.

11. The apparatus according to claim 9, wherein a signal defines a frame and one of its symbols is provided as a preamble occurring at the beginning of the frame and including a cyclic prefix, wherein the correlation determining means determines a correlation between a preamble and a cyclic prefix of the preamble.

12. The apparatus according to claim 9, wherein the correlation determining means determines a correlation between a symbol and a cyclic prefix of the symbol which is a replica of last samples of an actual symbol.

13. An apparatus, comprising:
a processor; and
a memory including computer program code, the memory and the computer program code configured to, with the processor, cause the apparatus at least to determine a correlation between a symbol received from a transmitter and a cyclic prefix of the symbol and output a result indicative thereof, wherein the correlation is determined based at least in part on the correlation between a late frequency difference estimate and an early frequency difference estimate, and
estimate a frequency difference between a frequency of the transmitter and a locally generated frequency of a receiver according to the result of the correlation between the late frequency difference estimate and the early frequency difference estimate.

14. The apparatus according to claim 13, wherein the memory and the computer program code are further configured to, with the processor, cause the apparatus at least to be used in an orthogonal frequency division multiplexing (OFDM) system, wherein the difference between the frequency of the transmitter and the locally generated frequency of the receiver is a carrier frequency offset (CFO).

15. The apparatus according to claim 13, wherein the memory and the computer program code are further configured to, with the processor, cause the apparatus at least to determine a correlation between a symbol and a cyclic prefix of the symbol at the time of occurrence of the cyclic prefix.

16. The apparatus according to claim 13, wherein a signal defines a frame and one of its symbols is provided as a preamble occurring at the beginning of the frame and including a cyclic prefix, wherein the memory and the computer program code are further configured to, with the processor, cause the apparatus at least to determine a correlation between a preamble and a cyclic prefix of the preamble.

17. The apparatus according to claim 13, wherein the memory and the computer program code are further configured to, with the processor, cause the apparatus at least to determine the late frequency difference estimate $$y_L = y_L[\hat{n}] = y[\hat{n}] = \sum_{\eta=0}^{N_{FFT}-1} \underline{p}^*[\eta] r[\hat{n} - \eta],$$

where $$\underline{p}^*[\eta]$$

is a complex conjugate of a preamble in reversed order and r[n̂–η] is a received signal, and n̂ is a correct timing instant where the cyclic prefix occurs.

18. The apparatus according to claim 13, wherein the memory and the computer program code are further configured to, with the processor, cause the apparatus at least to determine a correlation between a symbol and a cyclic prefix of the symbol which is a replica of last samples of an actual symbol.

19. The apparatus according to claim 18, wherein the memory and the computer program code are further configured to, with the processor, cause the apparatus at least to generate the early frequency difference estimate $$y_E = y_E[\hat{n}] = \sum_{\eta=0}^{N_{FFT}-1} \underline{p}_E^*[\eta] r[\hat{n} - N_g - \eta]$$

where $$\underline{p}_E^*[\eta]$$

is a complex conjugate of a preamble in reversed order, $N_g$ is a number of the last samples of the actual symbol, $r[\hat{n}-N_g-\eta]$ is a received signal and $\hat{n}$ is a correct timing instant where the cyclic prefix occurs.

20. An apparatus, comprising:

a processor; and a memory including computer program code, the memory and the computer program code configured to, with the processor, cause the apparatus at least to generate a correlation between a symbol received from a transmitter and a cyclic prefix of the symbol and output a result indicative thereof, wherein the correlation is determined based at least in part on the correlation between a late frequency difference estimate and an early frequency difference estimate, and estimate a frequency difference between a frequency of the transmitter and a locally generated frequency of a receiver according to the result of the correlation between the late frequency difference estimate and the early frequency difference estimate.

21. The apparatus according to claim 20, wherein said receiver is included in a mobile equipment and/or said transmitter is included in a base station.

22. A mobile equipment, comprising:

a correlation determiner configured to determine a correlation between a symbol received from a transmitter and a cyclic prefix of the symbol and output a result indicative thereof, wherein the correlation is determined based at least in part on the correlation between a late frequency difference estimate and an early frequency difference estimate; and an estimator configured to estimate a frequency difference between a frequency of the transmitter and a locally generated frequency of the mobile equipment according to the result of the correlation between the late frequency difference estimate and the early frequency difference estimate.

23. The mobile equipment according to claim 22, wherein the correlation determiner is configured to be used in an orthogonal frequency division multiplexing (OFDM) system, wherein the difference between the frequency of the transmitter and the locally generated frequency of the mobile equipment is a carrier frequency offset (CFO).

24. The mobile equipment according to claim 22, wherein the correlation determiner is configured to determine a correlation between a symbol and a cyclic prefix of the symbol at the time of occurrence of the cyclic prefix.

25. The mobile equipment according to claim 22, wherein a signal defines a frame and one of its symbols is provided as a preamble occurring at the beginning of the frame and including a cyclic prefix, wherein the correlation determiner is configured to determine a correlation between a preamble and a cyclic prefix of the preamble.

26. The mobile equipment according to claim 22, wherein the correlation determiner is configured to determine the late frequency difference estimate $$y_L = y_L[\hat{n}] = y[\hat{n}] = \sum_{\eta=0}^{N_{FFT}-1} \underline{p}^*[\eta]r[\hat{n}-\eta],$$

where $$\underline{p}^*[\eta]$$

is a complex conjugate of a preamble in reversed order and $r[\hat{n}-\eta]$ is a received signal, and $\hat{n}$ is a correct timing instant where the cyclic prefix occurs.

27. The mobile equipment according to claim 22, wherein the correlation determiner configured to determine a correlation between a symbol and a cyclic prefix of the symbol which is a replica of last samples of an actual symbol.

28. The mobile equipment according to claim 27, wherein the correlation determiner configured to generate the early frequency difference estimate $$y_E = y_E[\hat{n}] = \sum_{\eta=0}^{N_{FFT}-1} \underline{p}_E^*[\eta]r[\hat{n}-N_g-\eta]$$

where $$\underline{p}_E^*[\eta]$$

is a complex conjugate of a preamble in reversed order, $N_g$ is a number of the last samples of the actual symbol, $r[\hat{n}-N_g-\eta]$ is a received signal and $\hat{n}$ is a correct timing instant where the cyclic prefix occurs.

29. A mobile equipment, comprising:

correlation determining means for determining a correlation between a symbol received from a transmitter and a cyclic prefix of the symbol and for outputting a result indicative thereof, wherein the correlation is determined based at least in part on the correlation between a late frequency difference estimate and an early frequency difference estimate; and estimating means for estimating a frequency difference between a frequency of the transmitter and a locally generated frequency of a mobile equipment according to the result of the correlation between the late frequency difference estimate and the early frequency difference estimate.

30. A computer program embodied on a computer readable medium, the computer program being configured to control a processor to perform:

determining a correlation between a symbol received from a transmitter and a cyclic prefix of the symbol and outputting a result indicative thereof, wherein the correlation is determined based at least in part on the correlation between a late frequency difference estimate and an early frequency difference estimate; and estimating a frequency difference between a frequency of the transmitter and a locally generated frequency of a receiver according to the result of the correlation between the late frequency difference estimate and the early frequency difference estimate.

31. The computer program according to claim 30, which the processor is in an orthogonal frequency division multiplexing (OFDM) system, wherein the difference between the frequency of the transmitter and the locally generated frequency of the receiver is a carrier frequency offset (CFO).

32. The computer program according to claim 30, wherein a correlation between a symbol and the cyclic prefix is carried out at the time of occurrence of the cyclic prefix.

33. The computer program according to claim 30, wherein a signal defines a frame and one of its symbols is provided as a preamble occurring at the beginning of the frame and including a cyclic prefix, and wherein a correlation between a preamble and the cyclic prefix is used for estimating the frequency difference.

34. The computer program according to claim 30, wherein the late frequency difference estimate is generated by using the equation $$y_L = y_L[\hat{n}] = y[\hat{n}] = \sum_{\eta=0}^{N_{FFT}-1} \underline{p}^*[\eta] r[\hat{n} - \eta],$$

where $$\underline{p}^*[\eta]$$

is a complex conjugate of a preamble in reversed order and $r[\hat{n}-\eta]$ is a received signal, and $\hat{n}$ is a correct timing instant where the cyclic prefix occurs.

35. The computer program according to claim 30, wherein the cyclic prefix is provided as a replica of last samples of an actual symbol.

36. The computer program according to claim 35, wherein the early frequency difference estimate is generated by using the equation:

$$y_E = y_E[\hat{n}] = \sum_{\eta=0}^{N_{FFT}-1} \underline{p}^*_E[\eta] r[\hat{n} - N_g - \eta]$$

where $$\underline{p}^*_E[\eta]$$

is a complex conjugate of a preamble in reversed order, $N_g$ is a number of the last samples of the actual symbol, $r[\hat{n}-N_g-\eta]$ is a received signal and $\hat{n}$ is a correct timing instant where the cyclic prefix occurs.

37. The apparatus according to claim 13, wherein said receiver is included in a mobile equipment and/or said transmitter is included in a base station.

38. The method according to claim 1, wherein the late frequency difference estimate is based on a late channel estimate and the early frequency difference estimate is based on an early channel estimate.

* * * * *